United States Patent

Bringley et al.

Patent Number: 5,464,568
Date of Patent: Nov. 7, 1995

[54] ALKALINE EARTH METAL FLUOROBROMOIODIDE STORAGE PHOSPHOR, AND RADIATION IMAGE STORAGE PANEL, AND METHOD

[75] Inventors: Joseph F. Bringley, Rochester; Philip S. Bryan, Webster; Andrea M. Hyde, Hamlin, all of N.Y.

[73] Assignee: Eastman Kodak Company, Rochester, N.Y.

[21] Appl. No.: 300,116

[22] Filed: Sep. 2, 1994

Related U.S. Application Data

[63] Continuation-in-part of Ser. No. 157,583, Nov. 24, 1993, abandoned.

[51] Int. Cl.$^6$ .................................................. C09K 11/61
[52] U.S. Cl. ...................... 252/301.4 H; 250/484.2
[58] Field of Search ............... 252/301.4 H; 250/484.1; 428/691

[56] References Cited

U.S. PATENT DOCUMENTS

| | | | |
|---|---|---|---|
| 2,502,529 | 4/1950 | Murray | 250/483 |
| 2,887,379 | 5/1959 | Blake et al. | 430/139 |
| 3,023,313 | 2/1962 | De La Mater et al. | 252/301.4 H |
| 3,300,310 | 1/1967 | Kennard et al. | 430/139 |
| 3,300,311 | 1/1967 | Kennard et al. | 430/139 |
| 3,617,285 | 11/1971 | Staudenmayer | 252/301.2 R |
| 3,743,833 | 7/1973 | Martic et al. | 250/483 |
| 3,836,784 | 9/1974 | Bates et al. | 250/483.1 |
| 4,076,897 | 2/1978 | Joiner | 252/301.4 H |
| 4,109,152 | 8/1978 | Aoki et al. | 250/486 |
| 4,138,529 | 2/1979 | Mori et al. | 428/539 |
| 4,360,571 | 11/1982 | Rabatin | 428/691 |
| 4,374,905 | 2/1983 | Rabatin | 428/691 |
| 4,380,702 | 4/1983 | Takahashi et al. | 250/327.2 |
| 4,491,736 | 1/1985 | Teraoka | 250/484.1 |
| 4,505,989 | 3/1985 | Umemoto et al. | 428/691 |
| 4,912,333 | 3/1990 | Roberts et al. | 250/487.1 |
| 4,926,047 | 5/1990 | Takahashi et al. | 252/301.4 H |
| 5,077,144 | 12/1991 | Takahashi et al. | 252/301.4 H |
| 5,153,078 | 10/1992 | Kojima et al. | 428/690 |
| 5,227,254 | 7/1993 | Brixner et al. | 428/691 |

FOREIGN PATENT DOCUMENTS

| | | |
|---|---|---|
| 142734A | 5/1985 | European Pat. Off. . |
| 0234385B1 | 9/1991 | European Pat. Off. . |
| 2017140A | 10/1979 | United Kingdom . |

OTHER PUBLICATIONS

Research Disclosure, vol. 154, Feb. 1977, Item 15444.
Research Disclosure, vol. 176, Dec. 1978, Item 17643, Section XVII.
Research Disclosure, vol. 184, Aug. 1979, Item 18431, Section I.

*Primary Examiner*—C. Melissa Bonner
*Attorney, Agent, or Firm*—Robert Luke Walker

[57] ABSTRACT

A radiation image storage phosphor; a composition of matter including the storage phosphor and a stabilizer for iodine; and a radiation image storage panel including the inventive phosphor. The storage phosphor has a combination of species characterized by the relationship:

$$(Ba_{1-a-b-c}Mg_aCa_bSr_c)FBr_{1-z}I_z{:}rKX{:}yA{:}eQ{:}tD$$

where X is selected from the group consisting of F, Cl, Br, and I; A is selected from the group consisting of Eu, Ce, Sm, and Tb; Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$; D is selected from the group consisting of V, Cr, Mn, Fe, Co, and Ni; a+b+c is from 0 to 0.4; z is from $1\times10^{-4}$ to 1; r is from $10^{-6}$ to 0.1; y is from $1\times10^{-4}$ to 0.1; e is from $10^{-5}$ to 0.1; and t is from 0 to $10^{-2}$.

16 Claims, 1 Drawing Sheet

ALKALINE EARTH METAL FLUOROBROMOIODIDE STORAGE PHOSPHOR, AND RADIATION IMAGE STORAGE PANEL, AND METHOD

This is a Continuation-In-Part of application Ser. No. 08/157,583, filed 24 Nov. 1993, now abandoned.

FIELD OF THE INVENTION

The invention relates to radiation image storage phosphors, and radiation image storage panels. The invention more particularly relates to a radiation image recording and reproducing method and to an alkaline earth metal fluorobromoiodide storage phosphor which contains potassium. The phosphor may be represented by the general formula:

$$(Ba_{1-a-b-c}Mg_aCa_bSr_c)FBr_{1-z}I_z.rKX:yA:eQ:tD.$$

More particularly, the invention also relates to a composition of matter which consists essentially of a combination of species which satisfy the above general formula and an iodine stabilizer. The invention further more particularly relates to a radiation image storage panel incorporating the inventive phosphor.

BACKGROUND OF THE INVENTION

A radiographic phosphor panel contains a layer of phosphor, a crystalline material which responds to X-radiation on an image-wise basis. Like many other crystalline materials, radiographic phosphors have a crystal matrix which allows for the replacement of some atoms by other similar atoms, but does not readily accept other atoms or moieties. Radiographic phosphor panels can be classified, based upon their phosphors, as prompt emission panels and image storage panels.

Intensifying screens are the most common prompt emission panels. Intensifying panels are used to generate visible light upon exposure of the intensifying panel to X-radiation. A sheet of photographic film is positioned to intercept the visible light generated and commonly is pressed against the intensifying panel within a light-tight cassette. Other prompt emission panels operate similarly, but in place of the photographic film have some other means for visualizing the X-radiation.

Storage panels have storage phosphors, that have the capability of storing latent X-ray images for later release, apparently by locally trapping electron-hole pairs created by incident X-rays. Storage phosphors are distinguishable from the phosphors used in X-ray intensifying or conversion screens. In the latter, a latent image is not stored and X-radiation causes the immediate release of visible light from irradiated phosphor crystals.

Radiation image storage panels are used in computed radiography. The panel is first exposed to X-radiation to create a latent image. The panel is then stimulated with longer wavelength radiation, resulting in the emission of radiation at a third wavelength. Typically a laser having a red or infrared beam is scanned over the panel, resulting in the emission of green or blue radiation. The emitted light is collected and the resulting signal is processed electronically to produce a final image.

Alkaline earth metal fluorohalide storage phosphors are described in a number of patent publications. U.S. Pat. No. 4,926,047 teaches a radiation image storage panel including storage phosphors designated by the general formula:

$$MIIFX.aMIX'.bM'IIX''_2.cMIIIX'''_3.xA:yEu^{2+};$$

in which MII is Ba, Sr, and/or Ca; MI is Li, Na, K, Rb, and/or Cs; M'II is Be and/or Mg; MIII is Al, Ga, In and/or Tl; A is metal oxide; X is Cl, Br, and/or I; X', X'', and X'''are F, Cl, Br, and/or I; a is from 0 to 2; b is from 0 to $10^{-2}$; c is from 0 to $10^{-2}$; a+b+c is greater than or equal to $10^{-6}$; x is from 0 to 0.5; and y is from 0 to 0.2. This patent further teaches that metal oxides may be included in the starting materials for MFX type storage phosphors. Although it is not completely understood how the oxide improves the performance of the phosphor, advantages such as increased luminescence, improved afterglow, and sinter prevention have been mentioned. It is also not known how metal oxide is incorporated into phosphor. There are a number of possibilities, for example, incorporation within the host lattice, and adherence to the surface of crystals.

It has generally been taught in the art that the optimal MFX-type storage phosphor is BaFBr activated with 0.001 mole percent $Eu^{2+}$ and containing, as addenda, sodium halide, preferably sodium bromide.

U.S. Pat. No. 5,227,254 to Brixner et al. states:

"BaFBr:Eu is also the preferred phosphor for use in photostimulable storage panels."

European Patent Application No. 0 107 192 A1 by Takahashi et al describes a phosphor like that of U.S. Pat. No. 4,926,047. This application states:

"From the viewpoint of enhancement of the luminance of stimulated emission of the phosphor, each of X', X'' and X''' in the formula (I) [see above quotation from U.S. Pat. No. 4,926,047] are preferably Br or I, and particularly preferred is Br. MI is preferably Li or Na, and particularly preferred is Na."

U.S. Pat. No. 4,505,989 to Umemoto et al teaches a radiation image storage panel including storage phosphors designated by the general formula:

$$M''FX.xNaX':yEu^{2+}:zA;$$

in which M'' is at least one alkaline earth metal selected from the group consisting of Ba, Sr, and Ca; each of X and X' is at least one halogen selected from the group consisting of Cl, Br, and I; A is at least one transition metal selected from the group consisting of V, Cr, Mn, Fe, Co and Ni; and x, y, and z are numbers satisfying the conditions of $0<x<=2$, $0<y<=0.2$ and $0<z<=10^{-2}$. The Umemoto patent states:

"The phosphor used in the radiation image recording and reproducing method is improved in the luminance of stimulated emission by introducing a suitable amount of sodium halide (NaX') into a divalent europium activated barium fluorohalide phosphor ($BaFX:Eu^{2+}$) which is one of divalent europium activated alkaline earth metal fluorohalide phosphors.

Further, the above mentioned effect of the added NaX' to enhance the luminance of stimulated emission of the resulting phosphor has been confirmed in a divalent europium activated strontium fluorohalide phosphor ($SrFX:Eu^{2+}$) as well as in a divalent europium activated calcium flurohalide phosphor ($CaFX:Eu^{2+}$). In other words, it has been confirmed that a divalent europium activated alkaline earth metal fluorohalide phosphor containing a sodium halide and having the following formula, exhibits the stimulated emission of higher luminance than a divalent europium activated alkaline earth metal fluorohalide phosphor containing no sodium halide:

$$M''FX.xNaX':yEu^{2+}$$

in which M" is at least one alkaline earth metal selected from the group consisting of Ba, Sr, and Ca; each of X and X' is at least one halogen selected from the group consisting of Cl, Br, and I; and x and y are numbers satisfying the conditions of 0<x<=2, 0<y<=0.2, respectively".

Divalent europium activated alkaline earth metal fluorohalide containing iodide is not distinguished from other phosphors within the scope of the Umemoto patent.

European Patent Application No. 0 142 734 A1 teaches a phosphor described by the formula:

$$BaF(Br_{1-x}I_x):yEu^{2+}$$

This application states that:

"the phosphor containing three kinds of elements of fluorine, bromine and iodine as halogen which is a host component of the phosphor is prominently enhanced in the luminance of stimulated emission. The radiation image recording and reproducing method employing said stimulable phosphor can be remarkably enhanced in the sensitivity."

There is no teaching or suggestion as to use of addenda.

Degradation of final images due to panel discoloration has long been recognized for intensifying screens. Radiation image storage panels, unlike intensifying screens, are subject to degradative losses of both emitted light and stimulating radiation. Since these effects are cumulative, discoloration can be an even more serious issue in storage panels than in intensifying screens.

Yellowing of a phosphor layer of a radiation image storage phosphor panel, in which the phosphor contains iodine, is described in European Patent Specification No. EP 0 234 385 B1. The yellowing is ascribed to liberation of free iodine. The phosphor is divalent europium activated alkaline earth metal fluorohalide phosphor containing iodide or bismuth activated alkali metal halide phosphor containing iodide. The solution described for the yellowing problem, is incorporation in the phosphor layer of a compound containing a free epoxy group and/or a compound selected from: phosphites, organotin compounds, and specific metal salts of organic acids.

U.S. Pat. No. 4,374,905, to Rabatin, teaches a solution to both discoloration of an intensifying screen by "volatile organic constituents" and attack by water. The phosphor for an intensifying screen was milled with anhydrous MgSO4 or ZnSO4 during preparation of the screen. It was proposed that the protective action was based upon the reaction:

$$MgSO_4 + 2HOH \rightarrow Mg(OH)_2 + 2H^+ + SO_4^{2-}$$

U.S. Pat. No. 3,836,784, to Bates et al, teaches that small amounts of "stabilizers", such as sodium thiosulfate or potassium thiosulfate can be included in the fluorocarbon binder of an intensifying screen. Bates et al, which used an iodide containing phosphor, noted:

"[A]ctivated iodide phosphors are extremely hydroscopic. Absorption of small amounts of water rapidly reduces the conversion efficiency to a vanishingly small value. In order to employ activated iodide phosphors it is therefore necessary to provide the activated iodide phosphor in the screen in a form in which it remains stable for long periods of time.

"Various ways have been taught for using thallium activated potassium iodide and protecting the iodide from moisture." (Bates et al, column 1, lines 20-30)

U.S. Pat. No. 3,023,313 to De La Mayer et al teaches the addition of small amounts of sodium thiosulfate or potassium thiosulfate to the polymer binder of an intensifying screen.

In U.S. Pat. No. 4,360,571, to Rabatin, phosphors were treated with fatty acids or metal salts of fatty acids to prevent discoloration by "volatile organic constituents" and attack by water.

In GB 2 017 140 A, intensifying screens were stabilized against discolouration and hydrolysis by incorporation of a compound containing a free epoxy group and, optionally, a dialkyl tin compound such as dibutyl tin dioctyl as an additional stabilizer.

As a matter of convenience, a material which can be added to phosphor panels or compositions for the purpose of stabilizing against iodine related yellowing is referred to herein as a "stabilizer for iodine" or "iodine stabilizer".

It would be highly desirable to provide a storage phosphor and image storage panel composition which is markedly improved in its sensitivity compared to those discussed above.

SUMMARY OF THE INVENTION

The invention, in its broader aspects, provides a storage phosphor; a composition of matter including the storage phosphor and a stabilizer for iodine; and a storage panel including the inventive phosphor. The inventive storage phosphor consists essentially of a combination of species characterized by the relationship:

$$(Ba_{1-a-b-c}Mg_aCa_bSr_c)FBr_{1-z}I_z{:}rKX{:}yA{:}eQ{:}tD$$

where X is selected from the group consisting of F, Cl, Br, and I; A is selected from the group consisting of Eu, Ce, Sm, and Tb; Q is selected from the group consisting of BeO, MgO, CaO, SrO, BaO, ZnO, Al$_2$O$_3$, La$_2$O$_3$, In$_2$O$_3$, SiO$_2$, TiO$_2$, ZrO$_2$, GeO$_2$, SnO$_2$, Nb$_2$O$_5$, Ta$_2$O$_5$, and ThO$_2$; D is selected from the group consisting of V, Cr, Mn, Fe, Co, and Ni; a+b+c is from 0 to 0.4; z is from $1\times10^{-4}$ to 1; r is from $10^{-6}$ to 0.1; y is from $1\times10^{-4}$ to 0.1; e is from $10^{-5}$ to 0.1; and t is from 0 to $10^{-2}$.

Contrary to the teachings of U.S. Pat. Nos. 4,505,989, 4,926,047 and 5,227,254 and European Patent Application 0 107 192 A1, the storage phosphor of the invention is a fluorobromoiodide phosphor which includes potassium rather than sodium as addenda and has very good photostimulated luminescence response.

It is an advantageous effect of at least some of the embodiments of the invention that storage phosphors and compositions of matter and image storage panels are provided in which relative photostimulated luminescence intensities are increased relative to a control lacking the potassium halide.

BRIEF DESCRIPTION OF THE FIGURES

The above-mentioned and other features and objects of this invention and the manner of attaining them will become more apparent and the invention itself will be better understood by reference to the following description of an embodiment of the invention taken in conjunction with the accompanying figures wherein.

DESCRIPTION OF THE PARTICULAR EMBODIMENTS

Figure 1:
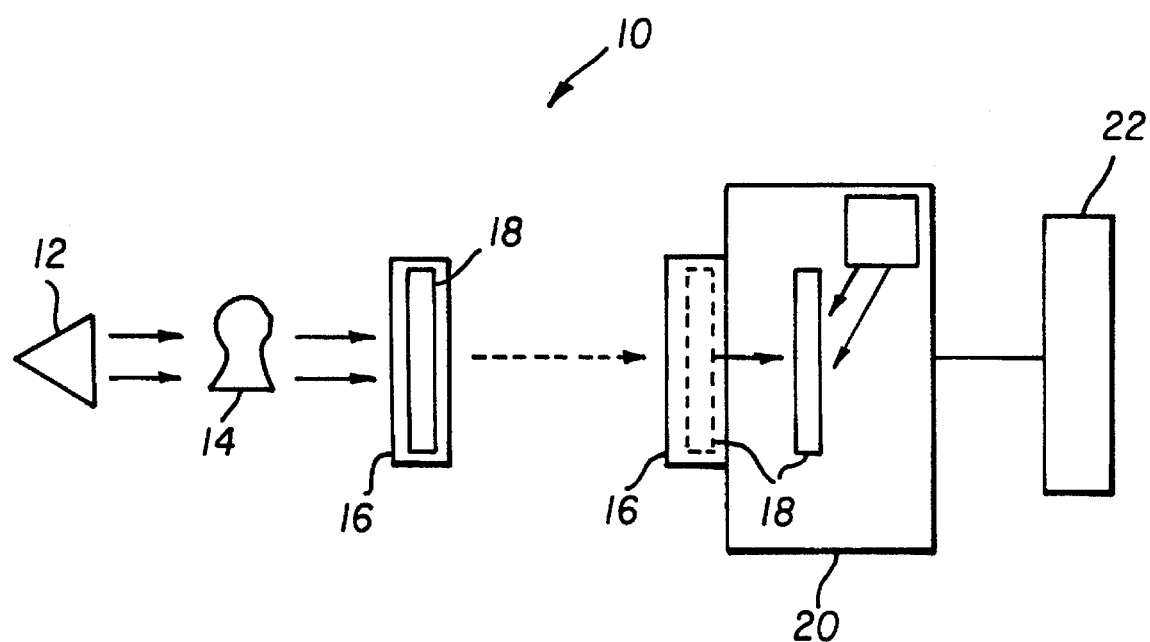
FIG. 1 is a schematic diagram of an embodiment of a system incorporating the method of the invention.

The method of the invention utilizes a specific storage phosphor (described below as the "storage phosphor of the invention" or the "alkaline earth metal fluorobromoiodide storage phosphor of the invention") to record a radiation image, which is subsequently released by exposing the storage phosphor to light having a wavelength in the range of 450–800 nanometers. The storage phosphor of the invention demonstrates surprisingly improved photostimulated luminescence response (PSL response). This provides a surprisingly improved method of recording and reproducing a radiation image.

Referring now to FIG. 1, an embodiment of a system 10 incorporating the method of the invention is illustrated in schematic form. The system 10 includes a source 12 of x-rays that directs a beam of x-radiation at a patient or study item 14. Radiation transmitted or reflected by patient or study item 14 is directed to a cassette 16. Within cassette 16 is a radiation image storage panel 18 aligned to receive the transmitted or reflected radiation. Storage panel 18 has a layer that includes the storage phosphor of the invention. Cassette 16 protects panel 18 from inadvertent exposure to light capable of releasing radiant energy stored within the storage panel 18.

After imagewise exposure, the cassette 16 including the storage panel 18 is delivered to a processing device 20. The storage panel 18 is removed from the cassette 16 and the storage panel 18 is exposed to electromagnetic radiation having a wavelength within the range of 450–800 nanometers to release the radiant energy stored in the phosphor. The emitted light is detected and processed and the resulting processed image or information (indicated schematically as element 22) is made available to users of the system.

The alkaline earth metal fluorobromoiodide storage phosphor of the invention consists essentially of a combination of species characterized by the relationship:

$$(Ba_{1-a-b-c}Mg_aCa_bSr_c)FBr_{1-z}I_z \cdot rKX : yA : eQ : tD.$$

In formula (1), X is selected from the group consisting of F, Cl, Br, and I. A is selected from the group consisting of Eu, Ce, Sm, and Tb. Q is an oxide selected from BeO, MgO, CaO, SrO, BaO, ZnO, Al2O3, La23, In2O3, SiO2, TiO2, ZrO2, GeO2, SnO2, Nb2O5, Ta2O5, and ThO2. Specific oxides that are currently preferred are: Al2O3 and SiO2. D is selected from the group consisting of V, Cr, Mn, Fe, Co, and Ni. Numbers are represented by the following: a+b+c is from 0 to 0.4; z is from $1\times10^{-4}$ to 1; r is from $10^{-6}$ to 0.1; y is from $1\times10^{-4}$ to 0.1; e is from $10^{-5}$ to 0.1; and t is from 0 to $10^{-2}$.

The same designations appearing elsewhere herein have the same meanings unless specifically stated to the contrary. Grouped species, for example the species defined by X, are to be understood as inclusive of combinations of species in that group. It should also be understood, that even when oxide is not specifically added, oxygen is a normal trace ingredient in phosphors described herein and phosphors known in the art generally, since it is not ordinary practice in the art to take the extraordinary measures necessary to exclude traces of oxygen from a phosphor preparation.

The storage phosphor of the invention is produced by firing a precursor composition comprising starting materials having species characterized by the above defined relationship. The exact composition of the unfired precursor can be varied extensively, in terms of both volatile components and selection of individual salts, within limits defined by the composition of the inventive phosphor. Selection of particular components of the unfired precursor which do not alter the composition of the inventive phosphor is largely a matter of convenience. For example, one embodiment of the inventive phosphor can be prepared using the following components or their hydrates:

BaF2;

one or more alkaline earth metal fluorides selected from: MgF2, CaF2, and SrF2;

one or more alkaline earth metal iodides selected from BaI2, MgI2, CaI2, and SrI2;

one or more alkaline earth metal bromides selected from BaBr2, MgBr2, CaBr2, and SrBr2;

one or more potassium halides selected from KI, KBr, KCl, and KF;

at least one trivalent europium-(halide, oxide, nitrate, or sulfate); and at least one transition metal compound selected from compounds of manganese, vanadium, chromium, iron, cobalt, and nickel with halide, oxide, nitrate or sulfate.

The storage phosphor of the invention is subject to yellowing due to the formation of molecular iodine as a result of attack on the phosphor by oxygen and water. It is therefore highly preferred that provision be made, in using the phosphor of the invention, to exclude atmospheric oxygen and water or to stabilize iodine in the phosphor matrix or both. The composition of matter of the invention includes the phosphor of the invention and stabilizer for iodine. A variety of iodine stabilizers are known in the art, as discussed above, however, it is preferred that the iodine stabilizer be an oxosulfur reducing agent for molecular iodine. Such iodine stabilizers are discussed in greater detail below, as is the disposition of the iodine stabilizer relative to the phosphor.

In a particular embodiment of the invention, the storage phosphor is the product of firing a precursor composition which contains, in addition to the combination of species characterized by the relationship:

$$(Ba_{1-a-b-c}Mg_aCa_bSr_c)FBr_{1-z}I_z \cdot rKX : yA : eQ : tD,$$

an iodine stabilizing addenda. The term "iodine stabilizing addenda" is used herein to describe an iodine stabilizer which can be added to the precursor composition prior to firing which will reduce yellowing of the precursor composition due to the formation of molecular iodine, without degrading the photostimulated luminescence response of the phosphor produced. In a preferred embodiment of the invention, the addition of iodine stabilizing addenda results in a large increase in photostimulated luminescence response. In that embodiment of the invention, the iodine stabilizing addenda is an oxygen and sulfur containing reducing agent for molecular iodine and the storage phosphor of the invention is produced utilizing an oxosulfur reducing agent containing phosphor intermediate, disclosed in a U.S. patent application Ser. No. 08/157,582, filed Nov. 24, 1993, now abandoned in favor of CIP application Ser. No. 08/300,113, filed Sep. 2, 1994, by Joseph F. Bringley, Philip S. Bryan and Andrea M. Hyde, entitled "STABILIZED PHOSPHOR INTERMEDIATES, STORAGE PHOSPHORS, RADIATION IMAGE STORAGE PANELS, AND PREPARATION METHODS; (hereafter referred to as "stabilized phosphor intermediates applications), the disclosure of which is hereby incorporated herein by reference.

The terms "oxosulfur reducing agent for molecular iodine" and "oxosulfur reducing agent" are used to designate oxygen and sulfur containing species capable of reducing free (molecular) iodine according to the half-reaction:

$$I_2 + 2e^- \rightarrow 2I^-$$

An oxosulfur reducing agent includes a moiety or ion of the general formula $S_jO_k$, where j and k are positive integers such that the ratio, j/k is defined by 0.25<j/k<1.0.

This formula is inclusive of species in which $S_jO_k$ is a free ion and species in which $S_jO_k$ is a charge bearing moiety covalently linked to another group. The terms "oxosulfur reducing agent" and the like are similarly inclusive of both uncharged species and charged anions. Where a distinction is necessary, for example, between a salt and its disassociated ion, it will be understood from context.

Many oxosulfur reducing agents have the general formula:

$D_nS_jO_k$ in which $D_n$ represents n cations chosen such that charge neutrality is obeyed. $S_jO_k$ ions of these oxosulfur reducing agents include: $SO_3^{2-}$, $S_2O^{2-}$, $S_2O_3^{2-}$, $S_2O_5^{2-}$, and $S_4O_6^{2-}$. $S_jO_k$ ions do not include $SO_4^{2-}$, $SO_5^{2-}$, and $S_2O_8^{2-}$, since these ions do not meet the above-indicated j/k ratio and are not reducing agents for molecular iodine. Suitable cations, also referred to herein as "counterions", are discussed in detail below.

A particular example of oxosulfur reducing agent is thiosulfate, $S_2O_3^{2-}$, such as barium thiosulfate, $BAS_2O_3$. Thiosulfate salts can be represented by the formula:

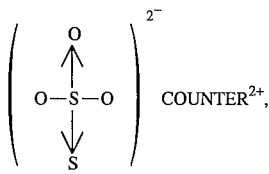

where COUNTER represents the counterion. The central sulfur atom has an oxidation number of 6+ and the outer sulfur atom has an oxidation number of 2−. Thiosulfate reacts with free (molecular) iodine in accordance with the following equation:

$2S_2O_3^{2-} + I_2 \rightarrow S_4O_6^{2-} + 2I^-$

In another particular embodiment of the invention, the oxosulfur reducing agent is a polythionate. Polythionate ions are often represented by the general formula:

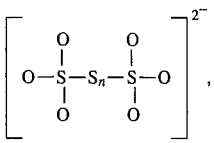

where n is from 1 to 22 or higher. The polythionate: $S_4O_6^{2-}$, which is commonly known as tetrathionate, is a product of the reaction of thiosulfate and free iodine.

Some other oxosulfur reducing agents are commonly referred to as "Bunte compounds" or "Bunte salts" and have the general structure:

R'SSO₃D, where R' is a covalently bonded organic substituent and D is the counterion. Suitable R' groups include primary and secondary alkyl, having from 1 to 20 carbons. R' can be substituted or unsubstituted. Bunte compounds can be produced by the sulfonatothiode-halogenation of alkyl halides with thiosulfate. Bunte compounds reduce free iodine in reaction schemes like the following:

R'SSO₃D+I₂+H₂O→R'S—SR'+DHSO₄+HI

The counterion, "D", in the oxosulfur reducing agent formulas above, can be a simple inorganic cation or a complex organic or inorganic cation. Counterions can be selected on the basis of convenience and non-interference with the desired characteristics of the phosphor produced. For example, if the phosphor includes a particular alkaline earth metal, the counterion can be selected to be the same element. Alternatively, the counterion can be selected so as to volatilize during firing. An example of the latter is the ammonium ion.

The oxosulfur reducing agent is present, in the stabilized intermediate, in an amount sufficient to increase relative photostimulated luminescence intensities relative to the same phosphor absent the reducing agent for iodine. The unfired precursor defines an upper limit for the presence of sulfur in the inventive phosphor. In a preferred embodiment of the invention, sulfur is present in the unfired composition, and thus in the crystals of the inventive phosphor, in a molar ratio of sulfur to alkaline earth metal of less than 0.20, or preferably, less than 0.020. In a preferred embodiment of the invention, the minimum amount of sulfur present in the unfired composition is in a molar ratio of sulfur to alkaline earth metal of greater than $1 \times 10^{-4}$ and less than 0.020. Oxosulfur reducing species is believed to be retained in the inventive phosphor after firing, its presence, oxidation number and other characteristics have not been confirmed.

In the preparation of the inventive phosphor, the components are mixed together in a stoichiometric ratio as above described. The mixing may be provided by any convenient means, for example, grinding in a mortar, however it is preferred that the components be mixed as a solution or suspension in water. The precursor components can be dissolved in a common solvent, followed by stirring until a digestion/precipitation reaction occurs forming a precursor to the phosphor. The precursor, depending upon the conditions of the reaction, may be a mixture of the starting components, but can be, for example, a host lattice with Eu in the +3 oxidation state. In this example, firing drives Eu to the +2 oxidation state. The advantage of the solution/ suspension method is that the components of the phosphor are distributed in a very intimate mixture.

A suitable preparation procedure utilizing a solution/ suspension, is described in U.S. Pat. No. 4,505,989 to Umemoto et al:

"The mixing procedure is generally carried out in the form of a suspension using distilled water. The distilled water contained in the suspension is then removed to obtain a dry cake. The removal of the distilled water is preferably carried out at room temperature or not so high temperature (for example, not higher than 200° C.) under reduced pressure, or under vacuum, otherwise a combination of under reduced pressure and subsequent under vacuum. The obtained dry mixture is pulverized finely by means of a mortar or the like.

Then, the mixture of the starting materials for the phosphor is placed in a heat-resistant container such as a quartz boat, an alumina crucible or a quartz crucible, and fired in an electric furnace. The temperature for the firing suitably ranges from 600° C. to 1000° C. The firing period is determined depending upon the amount of the mixture of the starting materials charged into the heat resistant container, the firing temperature, etc., and generally ranges from 0.5 to 12 hours. As the firing atmosphere, there can be employed a weak reducing atmosphere such as a nitrogen gas atmosphere containing a small amount of hydrogen gas or a carbon dioxide gas atmosphere containing carbon monoxide gas.

The product obtained by firing conducted under the above-mentioned condition is taken out of the furnace, allowed to stand for cooling, and pulverized. The pulverized product may be again placed in the heat-resistant container and fired in the electric furnace. In the second firing, the temperature of the firing suitably ranges from 500° to 800° C. and the firing period suitably ranges from 0.5 to 12 hours. For carrying out the second firing, there can be employed an inert atmosphere such as a nitrogen gas atmosphere or an argon gas atmosphere, as well as the above-mentioned weak reducing atmosphere.

After firing is complete, the fired product is finely pulverized to obtain a powdery phosphor of the invention. The powdery phosphor thus obtained may be processed in a conventional manner involving a variety of procedures for the preparation of phosphors such as a washing procedure, a drying procedure and a sieving procedure." (column 5, line 23-column 6, line 9)

In preparing the phosphor, after the mixing is accomplished, the distilled water contained in the suspension may be removed by a number of methods including thermal drying, rotary drying, spray drying, or drying in a microwave oven. In the latter technique, the suspension is placed in a conventional microwave oven and "cooked" in the same manner as a food item, that is, the microwave oven is adjusted to remove water at a reasonable rate, while maintaining a relatively even temperature in the phosphor intermediate. The phosphor intermediate may be rotated periodically or continuously, as necessary, to help reduce temperature variations. The process is continued until the phosphor intermediate has the form of a dry, white cake. The different drying procedures, and variations in those procedures, can result in differences in the phosphor produced. Drying procedures may be optimized using the results achieved by microwave drying as a benchmark for a preferred phosphor.

In preparing the inventive phosphors, the precursor materials may be fired at a temperature between about 700° C. and about 1300° C.; or may be processed with a flux at lower firing temperatures. Potassium salts capable of decomposing to the corresponding oxide at temperatures up to about 1000° C. are particularly useful as fluxing agents. The other metals can also, if desired, be initially provided in the form of salts capable of being thermally decomposed to the corresponding oxides. Nitrate, chloride, carbonate and carboxylate salts are all specifically contemplated as starting materials. If organic oxosulfur reducing agents are used, a carbon dioxide atmosphere is desirable during firing to provide for the volatilization of residual carbon.

In the preparation of the phosphors of the invention, after firing, the particles are ground to a particle size suitable for forming the radiographic panels of the invention. The median particle size utilized is generally between about 0.5 and about 40 micrometers. A median particle size of between 1 and about 20 micrometers is preferred for ease of formulation, as well as optimizing panel properties, such as speed, sharpness and noise.

The radiographic panels of the invention containing the inventive phosphor are formed by conventional coating techniques where the phosphor powders are mixed with a solution of a resin binder material and coated by means such as blade coating onto a substrate. U.S. Pat. No. 4,505,989 to Umemoto et al, the disclosure of which is hereby incorporated herein by reference, describes suitable techniques known in the art for preparing an X-ray image storage panel.

The phosphors of the present invention can be blended with other phosphors, if desired, to form an panel having optimal properties for a particular application. Panel constructions containing more than one phosphor-containing layer are also possible, with the present phosphors being present in one or more of the phosphor-containing layers.

The phosphor containing layer of the panel may be overcoated with a protective layer. It is understood that both the protective layer, and the resin forming the matrix into which the phosphor particles are held are preferably formed of transparent resins that do not interfere with the passage of x-rays or stimulating radiation or the emitted light from the phosphors.

While it is in theory possible to prepare a luminescent layer that does not contain any ingredient other than the phosphor itself, in practice the luminescent layer of a panel contains in addition to phosphor particles a polymeric binder to give structural coherence to the luminescent layer. In general the binders useful in the practice of the invention are those conventionally employed in the art. Binders are generally chosen from a wide variety of known organic polymers which are transparent to x-rays, stimulating, and emitted light. Binders commonly employed in the art include sodium o-sulfobenzaldehyde acetal of poly(vinyl alcohol); chlorosulfonated poly(ethylene); a mixture of macromolecular bisphenol poly(carbonates) and copolymers comprising bisphenol carbonates and poly(alkylene oxides); aqueous ethanol soluble nylons; poly(alkyl acrylates and methacrylates) and copolymers of poly(alkyl acrylates and methacrylates with acrylic and methacrylic acid); poly(vinyl butyral); linear polyesters; and poly(urethane) elastomers. These and other useful binders are disclosed in U.S. Pat. Nos. 2,502,529; 2,887,379; 3,617,285; 3,300,310; 3,300,311; and 3,743,833; and in Research Disclosure, Vol. 154, February 1977, Item 15444, and Vol. 182, June 1979. Research Disclosure is published by Kenneth Mason Publications, Ltd., Emsworth, Hampshire PO10 7DD, England. Particularly preferred binders are poly(urethanes), such as those commercially available under the trademark Estane from Goodrich Chemical Co., the trademark Permuthane from the Permuthane Division of ICI, and the trademark Cargill from Cargill, Inc.

Any conventional ratio of phosphor to binder can be employed. Generally thinner phosphor layers and sharper images are realized when a high weight ratio of phosphor to binder is employed. Preferred phosphor to binder ratios are in the range of from about 7:1 to 25:1 for panel constructions intended to withstand commercial exposure repetitions without loss of structural integrity. For limited or single exposure applications it is, of course, appreciated that any minimal amount of binder consistent with structural integrity is satisfactory.

For the highest attainable speeds a white support, such as a titania or barium sulfate loaded or coated support is employed. Particular reflective supports which offer a balance of speed and sharpness are those containing reflective microlenslets, such as are disclosed in U.S. Pat. No. 4,912,333 to Roberts, et al. In those instances in which it is desired to reduce the effective thickness of a phosphor layer below its actual thickness the phosphor layer is modified to impart a small, but significant degree of light absorption. If the binder is chosen to exhibit the desired degree of light absorption, then no other ingredient of the phosphor layer is required to perform the light attenuation function. It is specifically noted that the less structurally complex chromophores for ultraviolet absorption particularly lend themselves to incorporation in polymers. A separate absorber can be incorporated in the phosphor layer to reduce its effective thickness. The absorber can be a dye or pigment capable of absorbing light within a desired spectrum. Black dyes and pigments such as carbon black are, of course, generally useful with phosphors, because of their broad absorption spectra. It is preferrable, however, to include a dye or pigment which absorbs some of the stimulating radiation, generally provided by a laser; but mostly reflects emitted light. U.S. Pat. No. 4,491,736 to Teraoka teaches the use of such materials in storage panel.

Apart from the phosphor layers and the assembly features described above, the panel can be of any conventional construction. Panels typically have one or more flexible or rigid support layers. Flexible layers are most commonly polymeric. The most common polymeric supports are films of high dimensional integrity, such as poly(ethylene terephthalate) film supports. In a preferred embodiment of the invention, support is provided by one or more polymeric layers and by a rigid plate of aluminum or the like.

Metal layers, such as aluminum, may enhance reflection. Paper supports, though less common than film supports, are known and can be used for specific applications. Dyes and pigments are commonly loaded into supports to enhance absorption or reflection of light. Air can be trapped in supports to reflect ultraviolet and visible light. Supports and the subbing layers used to improve coating adhesion can be chosen from among those employed for silver halide photographic and radiographic elements, as illustrated by Research Disclosure, Vol. 176, December 1978, Item 17643, Section XVII, and Research Disclosure, Vol. 184, August 1979, Item 18431, Section I.

An overcoat, though not required, is commonly located over a storage phosphor layer for humidity and wear protection. In the claimed invention, the overcoat can be chosen using the criteria described above for the binder. The overcoat can be chosen from among the same polymers used to form either the screen binder or the support, with the requirements of toughness and scratch resistance usually favoring polymers conventionally employed for film supports. For example, cellulose acetate is an overcoat commonly used with the poly(urethane) binders. Overcoat polymers are often used also to seal the edges of the phosphor layer. In a preferred embodiment of the invention, the overcoat is produced in accordance with a U.S. patent application Ser. No. 08/157,581, filed Nov. 24, 1993, now U.S. Pat. No. 5,401,971, by Luther C. Roberts, entitled: OVERCOATED RADIATION IMAGE STORAGE PANEL AND METHOD FOR PREPARING RADIATION IMAGE STORAGE PANEL, the disclosure of which is hereby incorporated herein by reference.

While anticurl layers are not required for the panels, they are generally preferred for inclusion. The function of the anticurl layer is to balance the forces exerted by the layers coated on the opposite major surface of a support which, if left unchecked, cause the support to assume a non-planar configuration—e.g., to curl or roll up on itself. Materials forming the anticurl layers can be chosen from among those identified above for use as binders and overcoats. Generally an anticurl layer is formed of the same polymer as the overcoat on the opposite side of the support. For example, cellulose acetate is preferred for both overcoat and anticurl layers.

For best image definition, when the front panel support and subbing and anticurl layers are transparent, the phosphor layer either contains an absorber or overlies such a layer.

Any one or combination of conventional panel features compatible with the features described herein can, of course, be employed. Conventional storage panel constructions are disclosed in U.S. Pat. No. 4,380,702 to Takahashi et al, the disclosure of which is hereby incorporated by reference. Conventional intensifying panel constructions are disclosed in Research Disclosure, Vol. 184, August 1979, Item 18431, hereby incorporated herein by reference.

It is preferred that the phosphor panel be produced in accordance with a U.S. patent application Ser. No. 08/157, 797, filed Nov. 24, 1993, by Joseph F. Bringley, Philip S. Bryan, and Andrea M. Hyde, entitled: PIGMENT STABILIZED RADIATION IMAGE STORAGE PANEL AND METHOD FOR PREPARING RADIATION IMAGE STORAGE PANEL, the disclosure of which is hereby incorporated herein by reference; or a U.S. patent application Ser. No. 08/157,796, filed Nov. 24, 1993, now U.S. Pat. No. 5,427,868, by Joseph F. Bringley, Barbara Fisher, Andrea M. Hyde, Philip S. Bryan, and Luther C. Roberts, entitled: RADIOGRAPHIC PHOSPHOR PANEL HAVING BINDER COMPATIBLE OXOSULFUR STABILIZER AND METHOD FOR PREPARING PHOSPHOR PANEL, the disclosure of which is also hereby incorporated herein by reference. The phosphor panels disclosed therein have oxosulfur reducing agent dispersed in a layer of the panel to stabilize against yellowing. The phosphor panels have increased photostimulated luminescence in comparison to unstabilized controls. It has been determined by applicants that the increased photostimulated luminescent provided thereby is cumulative with the increased photostimulated luminescent provided in the claimed invention.

The following Examples and Comparative Examples are presented to further illustrate and elucidate some preferred modes of practice of the invention.

Unless otherwise indicated, all starting materials were commercially obtained. The thiosulfate salts were obtained commercially except as follows. $BaS_2O_3 \cdot H_2O$ was prepared according to the following equation:

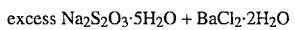
excess $Na_2S_2O_3 \cdot 5H_2O$ + $BaCl_2 \cdot 2H_2O$

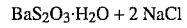
$BaS_2O_3 \cdot H_2O$ + 2 NaCl

In a typical procedure, barium chloride dihydrate was dissolved in about 2 parts by weight of distilled water and a 2-fold excess of sodium thiosulfate was dissolved separately in about 1.5 parts by weight distilled water. The solutions were filtered to remove insoluble impurities and were then heated to about 40°–50° C. The barium chloride solution was then added via an addition funnel to the thiosulfate solution over about 5 minutes with vigorous stirring, and a white precipitate immediately formed. The precipitate was then collected by vacuum filtration or other means and washed with copious amounts of distilled water to remove any residual sodium chloride by-product. The white solid was then air dried for 24 hours to yield very pure BaS2O3.H2O. The product was then analyzed by powder X-ray diffraction to confirm its identity and purity.

In order to reduce experimental variability, Examples and their Comparative Examples (as indicated by the groupings in the tables below) were run at the same time.

The relative photostimulated luminescence intensities (PSL) of the phosphor powders were measured by packing the powders into aluminum planchets (2 mm high by 24 mm diameter) at a coverage of about 1 g/cm$^2$ and exposing the sample to X-radiation. The X-ray source was a tungsten target tube operating at 15 kVp and 3.0 mA. After exposure to X-rays, the samples were stimulated with a 4-millisecond pulse at 633 nanometers from a 12 mW helium-neon laser. The stimulated emission was detected using a photomultiplier tube after passing through a Schott BG-25 filter. The PSL responses for examples are reported relative to the comparative examples whose response was arbitrarily set at 100 units.

The relative photostimulated luminescence intensities of the image storage panels were measured by cutting 2.6 centimeter disks from the panels, and simultaneously exposing examples and controls (comparative examples from the same table presented below) to filtered X-radiation. The X-ray source was a tungsten target tube operating at 70 kVp and 3.0 mA. The filtration consisted of a 3.5 centimeter thickness of aluminum. After exposure to X-rays the examples and comparative examples were stimulated with a 4-millisecond pulse at 633 nanometers from a 12 mW helium-neon laser. The stimulated emission was detected using a photomultiplier tube after passing through a Schott BG-25 filter. The responses were corrected for X-ray exposure variations by normalizing the measured response to an external standard. The PSL responses are reported relative to one of the comparative examples whose response was arbitrarily set equal to 100. The measured PSL responses were corrected for variations in phosphor coverage by dividing by the coverage value determined for that particular disk.

EXAMPLE 1

In a 2000 ml beaker containing a Teflon coated magnetic stir bar, 269.54 grams of $BaBr_2.2H_2O$ and 62.22 grams of $BaI_2.2H_2O$ were dissolved in a 2- to 3-fold excess of distilled water. The solution was then filtered. To the filtered solution was added 2.88 grams of fumed silica and 0.500 g of $BaS_2O_3.H_2O$ followed by KBr in the molar amount indicated in Table 1. 167.5 grams of $BaF_2$ containing 0.002 moles of $EuF_2$ and 0.01 mol $CaF_2$ were then added to the solution slowly with vigorous stirring. Stirring was maintained for about 1 hour and the resulting slurry was then spray-dried through an air driven rotary atomizer at an inlet temperature of 350° C. and an outlet temperature of 110° C. The resulting white powder was then placed into alumina crucibles and fired at a temperature of 840°–860° C. for 3.5 hours under flowing nitrogen. The phosphor powder after being allowed to cool under nitrogen, was then ground and sieved through a 38 micron screen and the PSL measured as described above. Results are presented in Table 1.

EXAMPLES 2–3

Examples 2–3 were performed and results are presented in the same manner as in Example 1, with the exception that the molar amount of KBr differed as indicated in Table 1.

COMPARATIVE EXAMPLES 1–4

Comparative Examples 1–4 were performed and results are presented in the same manner as in Example 1, with the exception that in Comparative Examples 1–3, NaBr was substituted for KBr. Molar amounts are indicated in Table 1. In Comparative Example 4, no alkali metal halide was added.

EXAMPLES 4–5

Examples 4–5 were performed in the same manner as in Example 1, with the exception that the molar amount of KBr differed as indicated in Table 1 and iodine stabilizer, $BaS_2O_3$, was added as indicated in Table 2. Results are presented in Table 2.

COMPARATIVE EXAMPLE 5–7

Comparative Examples 5–7 were performed and results are presented in the same manner as in Examples 4–5, with the exceptions that: Comparative Example 5 had no iodine stabilizer and had sodium bromide rather than potassium bromide; Comparative Example 6 had no alkali metal halide but included iodine stabilizer as indicated in Table 2; and Comparative Example 7 included neither alkali metal halide nor iodine stabilizer. Results are presented in Table 2.

EXAMPLES 6–7

Phosphors in Examples 6–7 were prepared in the same manner as Examples 2–3, respectively. In each example, the phosphor and 2 percent by weight $BaS_2O_3$ were dispersed in a 13 percent (weight/weight) solution of Permuthane U-6366 polyurethane marketed by ICI Polyurethanes Group of West Deptford, N.J. in 93:7 (weight/weight) dichloromethane/methanol solvent. The phosphor to binder ratio was about 15:1. Plate-coatings were prepared on polyethylene terephthalate supports and were allowed to air dry to produced storage panels. After drying the panels were overcoated with a polymer solution of cellulose acetate in acetone. PSL response of the storage panels was determined as described above. Results are presented in Table 3.

COMPARATIVE EXAMPLES 8–9

Comparative Examples 8–9 were performed and results are presented in the same manner as in Examples 6–7, with the exceptions that: Comparative Example 8 had 0.0005 (mol/mol phosphor) sodium bromide rather than potassium bromide; and Comparative Example 9 had no alkali metal halide. Results are presented in Table 3.

EXAMPLE 8

Example 8 was performed in the same manner as in Example 6. Results are presented in Table 4.

COMPARATIVE EXAMPLE 10

Comparative Example 10 was performed and results are presented in the same manner as in Example 8, with the exceptions that: 317.1 g of $BaBr_2.H_2O$ was used and no amount of $BaI2.H_2O$ and no amount of $BaS_2O_3.H_2O$ were added in the preparation. Results are presented in Table 4.

EXAMPLES 9–10

Strontium is a common contaminant in commercially available barium fluoride and is believed to have been present as a contaminant in the preceding examples and comparative examples. Examples 9 and 10 compare phosphors prepared with ordinary commercial-grade barium fluoride and highly purified barium fluoride.

Phosphors were prepared and evaluated in substantially the same manner as in Example 2, with the exceptions that:

in Example 9 the $BaF_2$ used contained 13,000 molar parts per million Sr and in Example 10 the $BaF_2$ used contained 10 molar parts per million Sr. Results are presented in Table 5.

TABLE 1

| Example or Comparative Example | Addenda | Ratio of Addenda to Phosphor (mol/mol) | PSL Response |
| --- | --- | --- | --- |
| Example 1 | KBr | 0.00025 | 116 |
| Example 2 | KBr | 0.0005 | 118 |
| Example 3 | KBr | 0.001 | 123 |
| Comparative Example 1 | NaBr | 0.00025 | 93 |
| Comparative Example 2 | NaBr | 0.0005 | 103 |
| Comparative Example 3 | NaBr | 0.001 | 97 |
| Comparative Example 4 | — | none | 100 |

TABLE 2

| Example or Comparative Example | Ratio of Addenda to Phosphor (mol/mol) | Ratio of $BaS_2O_3 \cdot H_2O$ to Phosphor (mol/mol) | PSL Response |
| --- | --- | --- | --- |
| Example 4 | 0.001 KBr | none | 155 |
| Comparative Example 5 | 0.005 NaBr | none | 77 |
| Example 5 | 0.001 KBr | 0.001 | 214 |
| Comparative Example 6 | none | 0.001 | 172 |
| Comparative Example 7 | none | none | 100 |

TABLE 3

| Example or Comparative Example | Addenda | Ratio of Addenda to Phosphor (mol/mol) | PSL Response |
| --- | --- | --- | --- |
| Example 6 | KBr | 0.0005 | 110 |
| Example 7 | KBr | 0.001 | 113 |
| Comparative Example 8 | NaBr | 0.0005 | 97 |
| Comparative Example 9 | none | none | 100 |

TABLE 4

| Example or Comparative Example | Phosphor | PSL Response |
| --- | --- | --- |
| Example 8 | $(Ba_{0.995}Ca_{0.005})FBr_{0.85}I_{0.15}$: 0.001Eu,0.0005K | 131 |
| Comparative Example 10 | $(Ba_{0.995}Ca_{0.005})FBr$: 0.001Eu,0.0005Na | 100 |

TABLE 5

Photostimulated luminescence of
$Ba_{(1-a)}Sr_{(a)}FBr_{0.85}I_{0.15}$:0.001Eu:0.0005K:0.001$BaS_2O_3 \cdot H_2O$

| Example or Comparative Example | Value of (a) | PSL Response |
| --- | --- | --- |
| Example 9 | 0.0065 | 100 |
| Example 10 | 0.000005 | 97 |

The preceding tables evidence the advantages and features of the invention. The results of Table 1 could not have been predicted based upon the art. Examples 1–3 clearly show that the PSL of the phosphor is increased when doped with small amounts of potassium. Comparative Examples 1–3 show a detrimental effect or no effect upon the resulting PSL with sodium doping. This is very surprising in view of the teachings of U.S. Pat. Nos. 4,505,989, 4,926,047 and 5,227,254. The data of Table 2 further demonstrate that the inventive phosphor containing potassium at its optimum value (determined from the results presented in Table 1) is improved in its PSL response with respect to the phosphor containing sodium at its optimum level (also determined from the results in Table 1). Table 2 furthermore demonstrates the advantage provided by use of an iodine stabilizer.

Tables 3 and 4 give the PSL responses of image storage panels prepared from phosphors of the invention. PSL responses for storage panels of the invention are higher than PSL responses of comparable panels using Na-containing europium activated barium fluorohalide storage phosphor. This is in stark contrast to the teachings of European patent application no. 0 107 191 A1 which states at page 8, line 31 to line 35:

"From the viewpoint of enhancement of the luminance of stimulated emission of the phosphor, each of X',X" and X'" in the formula $[M''FX \cdot aM^IX' \cdot bM^{III}X''_2 \cdot cM^{III}X'''_3 \cdot xA:yEu^{2+}]$ are preferably Br or I, and particularly preferred is Br. $M^I$ is preferably Li or Na, and particularly preferred is Na."

Examples 9–10 demonstrate that replacement of a substantial portion of Ba with Sr had little if any effect on PSL response.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A storage phosphor consisting essentially of the product of firing, at a temperature from about 700° to 1300° C.:

(1) a combination of species characterized by the relationship:

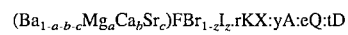
$(Ba_{1-a-b-c}Mg_aCa_bSr_c)FBr_{1-z}I_z \cdot rKX:yA:eQ:tD$ wherein
X is selected from the group consisting of F, Cl, Br, and I;
A is selected from the group consisting of Eu, Ce, Sm, and Tb;
Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$;
D is selected from the group consisting of V, Cr, Mn, Fe, Co, and Ni;
a+b+c is from 0 to 0.4;
z is from $1 \times 10^{-4}$ to 1;
r is from $10^{-6}$ to 0.1;
y is from $1 \times 10^{-4}$ to 0.1;
e is from $10^{-5}$ to 0.1; and
t is from 0 to $10^{-2}$; and (2) an oxosulfur reducing agent, said oxosulfur reducing agent being present with said combination of species in an amount sufficient to increase relative photostimulated luminescence intensities relative to the phosphor defined above absent said reducing agent for iodine.

2. The storage phosphor of claim 1 wherein said oxosulfur reducing agent is selected from the group consisting of Bunte compounds, having the general formula $R'SSO_3D$, where R' is a covalently bonded organic substituent and D is a counterion, and organic and inorganic oxosulfur salts having anions of the general formula $S_jO_k$ wherein $0.25 < j/k < 1.0$.

3. The storage phosphor of claim 2 wherein said oxosulfur reducing agent is present prior to firing in a molar ratio of sulfur to alkaline earth metal of from $1 \times 10^{-4}$ to 0.020.

4. The storage phosphor of claim 1 wherein said oxosulfur reducing agent is selected from the group consisting of: salts of $SO_3^{2-}$, $S_2O_4^{2-}$, $S_2O_3^{2-}$, $S_2O_5^{2-}$, and $S_4O_6^{2-}$.

5. A radiographic image storage panel comprising a support and a fluorescent layer including phosphor crystals capable of absorbing X-radiation and emitting longer wavelength electromagnetic radiation in response to stimulating radiation of a third wavelength, said phosphor crystals consisting essentially of the product of firing, at a temperature from about 700° to 1300° C.:

(1) a combination of species characterized by the relationship:

$$(Ba_{1-a-b-c}Mg_aCa_bSr_c)FBr_{1-z}I_z \cdot rKX:yA:eQ:tD$$

wherein
X is selected from the group consisting of F, Cl, Br, and I;
A is selected from the group consisting of Eu, Ce, Sm, and Tb;
Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$;
D is selected from the group consisting of V, Cr, Mn, Fe, Co, and Ni;
a+b+c is from 0 to 0.4;
z is from $1 \times 10^{-4}$ to 1;
r is from $10^{-6}$ to 0.1;
y is from $1 \times 10^{-4}$ to 0.1;
e is from $10^{-5}$ to 0.1; and
t is from 0 to $10^{-2}$, and (2) an oxosulfur reducing agent, said oxosulfur reducing agent being present with said combination of species in an amount sufficient to increase relative photostimulated luminescence intensities relative to the phosphor defined above absent said reducing agent for iodine.

6. A radiation image recording and reproducing method comprising the steps of:

exposing a storage phosphor to reflected or transmitted radiation from an object;

exposing said stimulable phosphor to electromagnetic radiation having a wavelength within the range of 450–800 nanometers to release the radiant energy stored therein as light emission, and detecting the emitted light;

said storage phosphor consisting essentially of the product of firing, at a temperature from about 700° to 1300° C.:

(1) a combination of species characterized by the relationship:

$$(Ba_{1-a-b-c}Mg_aCa_bSr_c)FBr_{1-z}I_z \cdot rKX:yA:eQ:tD$$

wherein
X is selected from the group consisting of F, Cl, Br, and I;
A is selected from the group consisting of Eu, Ce, Sm, and Tb;
Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$;
D is selected from the group consisting of V, Cr, Mn, Fe, Co, and Ni;
c is from about 0 to 0.4;
a+b+c is from about 0 to 0.4;
z is from $1 \times 10^{-4}$ to 1;
r is from $10^{-6}$ to 0.1;
y is from $1 \times 10^{-4}$ to 0.1;
e is from $10^{-5}$ to 0.1; and
t is from 0 to $10^{-2}$; and (2) an oxosulfur reducing agent, said oxosulfur reducing agent being present with said combination of species in an amount sufficient to increase relative photostimulated luminescence intensities relative to the phosphor defined above absent said reducing agent for iodine.

7. The method of claim 6 wherein c is from about 0.000005 to 0.4 and a+b+c is from about 0.000005 to 0.4.

8. The method of claim 7 wherein c is about 0.01.

9. The method of claim 7 wherein r is from $10^{-4}$ to 0.01.

10. The method of claim 7 wherein t=0.

11. The method of claim 7 wherein Q is selected from $Al_2O_3$ and $SiO_2$.

12. The method of claim 7 wherein A is Eu.

13. The method of claim 12 wherein e is 0.01.

14. The method of claim 7 wherein X is selected from the group consisting of F, Br, and I.

15. The method of claim 7 wherein z is from 0.05 to 0.5.

16. The method of claim 6 wherein a and c are 0 and b is from about 0.001 to 0.04.

* * * * *